(12) United States Patent
Hirano et al.

(10) Patent No.: US 9,109,836 B2
(45) Date of Patent: Aug. 18, 2015

(54) COMBUSTION DEVICE FOR MELTING FURNACE AND MELTING FURNACE

(75) Inventors: Makoto Hirano, Osaka (JP); Hitoshi Inoue, Hannan (JP)

(73) Assignee: Osaka Gas Co., Ltd., Osaka (JP)

( * ) Notice: Subject to any disclaimer, the term of this patent is extended or adjusted under 35 U.S.C. 154(b) by 504 days.

(21) Appl. No.: 13/503,259

(22) PCT Filed: Sep. 7, 2010

(86) PCT No.: PCT/JP2010/065315
§ 371 (c)(1),
(2), (4) Date: Jul. 12, 2012

(87) PCT Pub. No.: WO2011/048878
PCT Pub. Date: Apr. 28, 2011

(65) Prior Publication Data
US 2013/0137055 A1    May 30, 2013

(30) Foreign Application Priority Data
Oct. 23, 2009   (JP) ................................. 2009-244749

(51) Int. Cl.
| | | |
|---|---|---|
| *F27B 3/20* | (2006.01) | |
| *F23C 5/28* | (2006.01) | |
| *F23D 14/22* | (2006.01) | |

(Continued)

(52) U.S. Cl.
CPC ................. *F27B 3/205* (2013.01); *C03B 5/235* (2013.01); *F23C 5/28* (2013.01); *F23D 14/22* (2013.01); *F23D 23/00* (2013.01); *F27D 7/02* (2013.01); *F27D 17/004* (2013.01);

(Continued)

(58) Field of Classification Search
CPC .. F23C 5/28; F23C 2900/07021; F23D 14/22; F23D 23/00; C03B 5/235; F27D 7/02; F27B 3/205
USPC .......... 432/196; 431/8, 37, 41, 158, 171, 176, 431/178, 195, 198
See application file for complete search history.

(56) References Cited

U.S. PATENT DOCUMENTS 3,193,268 A * 7/1965 Robertson et al. ............. 432/161
3,523,781 A * 8/1970 Leveque ....................... 65/135.1

(Continued)

FOREIGN PATENT DOCUMENTS

EP    1546610 A1 * 6/2005
JP    07012473 A     1/1995

(Continued)

*Primary Examiner* — Steven B McAllister
*Assistant Examiner* — Steven Anderson, II
(74) *Attorney, Agent, or Firm* — The Webb Law Firm

(57) ABSTRACT

A combustion device for a melting furnace, capable of heating a melting target object and the ceiling portion of the furnace with the radiant heat of the flame, including a combustion space above the location of the melting target object, including a fuel injection nozzle having a plurality of fuel injecting portions, which portions include orifices disposed side by side horizontally relative to the direction of fuel injection, and formed side by side vertically relative to the same. The orifices are formed radially side by side as seen laterally, with a direction along a middle angle in the angular range between the fuel injection direction of the uppermost fuel injection orifice and the fuel injection direction of the lowermost fuel injection orifice being directed obliquely upwards. The fuel injection orifices of the upper fuel injecting portion are formed radially side by side as seen in the plane view.

2 Claims, 13 Drawing Sheets

(51) Int. Cl.
  *F23D 23/00* (2006.01)
  *F27D 7/02* (2006.01)
  *F27D 17/00* (2006.01)
  *F27D 99/00* (2010.01)
  *C03B 5/235* (2006.01)

(52) U.S. Cl.
  CPC ......... *F27D 17/008* (2013.01); *F27D 99/0033* (2013.01); *F23C 2900/07021* (2013.01)

(56) References Cited

U.S. PATENT DOCUMENTS

| | | | | |
|---|---|---|---|---|
| 4,927,357 | A | * | 5/1990 | Yap ................................ 432/22 |
| 5,217,366 | A | * | 6/1993 | Laurenceau et al. ............ 432/13 |
| 5,360,171 | A | * | 11/1994 | Yap ........................... 239/553.5 |
| 5,383,782 | A |   | 1/1995 | Yap |
| 7,188,476 | B2 | * | 3/2007 | Inoue et al. ..................... 60/737 |
| 7,303,388 | B2 | * | 12/2007 | Joshi et al. ...................... 431/10 |
| 2006/0038326 | A1 | * | 2/2006 | Vecchiet et al. ............... 266/218 |
| 2006/0057517 | A1 | * | 3/2006 | Joshi et al. ...................... 431/12 |

FOREIGN PATENT DOCUMENTS

| | | | | |
|---|---|---|---|---|
| JP | 2001050668 A | * | 2/2001 | ................ F27B 3/22 |
| JP | 3184774 B2 | * | 7/2001 | |
| JP | 2004301369 A | | 10/2004 | |
| JP | 2006105582 A | | 4/2006 | |
| JP | 2006275334 A | | 10/2006 | |

* cited by examiner

US 9,109,836 B2

COMBUSTION DEVICE FOR MELTING FURNACE AND MELTING FURNACE

TECHNICAL FIELD

The present invention relates to a combustion device for a melting furnace, wherein a fuel injection nozzle for injecting gas fuel to a combustion space upwardly of an area in a melting tank where a melting target object is present is configured to inject the gas fuel form a lateral portion of the combustion space and a combustion air feeding portion for feeding combustion air along an obliquely downward direction into the combustion space is provided at an upper portion of the fuel injection nozzle. The invention relates also to a melting furnace including this combustion device for the melting furnace.

BACKGROUND ART

Such combustion device for a melting furnace as described above is for use in a melting furnace configured to melt a melting target object such as glass, metal, etc. And, as a melting furnace equipped with such combustion device for a melting furnace, there is a so-called cross fired type melting furnace wherein the combustion devices for a melting furnace are disposed side by side on lateral sides of the melting tank along the direction of juxtaposition of an inlet opening for charging raw material and an outlet opening for taking out the melted object in the melting tank.

As such combustion device for a melting furnace, there is known one configured such that the fuel injection nozzle includes, at one vertical portion thereof, a fuel injecting portion having a plurality of fuel injection orifices formed side by side along the horizontal direction as seen from the fuel injection direction, with the plurality of fuel injection orifices being formed radially as seen in the plane view (see, e.g. Patent Document 1).

PRIOR ART DOCUMENT

Patent Document 1: Japanese Unexamined Patent Application Publication No. 2004-301369 (FIG. 3, FIG. 4, FIG. 9)

SUMMARY OF THE INVENTION

Object to be Achieved by Inventions

With the conventional melting furnace combustion device, the fuel injection nozzle includes, only at one vertical portion thereof, the fuel injecting portion having a plurality of fuel injection orifices disposed side by side in the horizontal direction. Therefore, the apparatus was not capable of heating the melting target object in an efficient manner.

That is, when gas fuel injected from the fuel injection nozzle is combusted with the air fed from the combustion air feeding portion, with the radiation heat from its combustion flame, the melting target object is heated. And, with this radiation heat of the combustion flame, the ceiling portion of the heated melting furnace is heated and the heating target object is heated also with the radiant heat from the heated ceiling portion.

Namely, as the melting target object is to be heated with the radiant heat of the combustion flame as well as with the radiant heat from the ceiling portion of the melting furnace, it is desired that both the heating of the melting target object with the radiant heat of the combustion flame and the heating of the ceiling portion of the melting furnace with the radiant heat of the combustion flame be effected in a favorable manner.

However, with the conventional melting furnace combustion device, the fuel injection nozzle includes, only at one vertical portion thereof, the fuel injecting portion having a plurality of fuel injection orifices disposed side by side in the horizontal direction. Hence, the combustion flame which is formed when the gas fuel injected from the fuel injection nozzle is combusted with the combustion air fed from the combustion air feeding portion has a narrow vertical width, so that it is difficult to effect the heating of the melting target object with the radiant heat of the combustion flame and the ceiling portion of the melting furnace with the radiant heat of the combustion flame in a favorable manner. In this regard, there is a need for improvement.

Incidentally, if the combustion flame has a narrow vertical width, the amount of heat discharged inside the melting furnace is small and the temperature of the combustion exhaust gas flowing in the flue is high.

In the case of the melting furnace wherein the combustion devices for a melting furnace are disposed side by side on lateral sides of the melting tank along the direction of juxtaposition of an inlet opening for charging raw material and an outlet opening for taking out the melted object, in the vicinity of the inlet in the melting tank, the melting target object before melting will be formed with vertical unevenness, whereas in the vicinity of the outlet, the melted melting target object will be formed with its top surface being flat. And, in the intermediate area between the inlet and the outlet, the melting target object in the middle of its melting is present with some vertical unevenness, not so significant vertical unevenness as that present in the vicinity of the inlet.

Therefore, in the vicinity of the inlet, it is desired that the combustion flame extend obliquely upward so as to prevent this combustion flame from coming into contact with the melting target object. Whereas, in the vicinity of the outlet, it is desired that the combustion flame extends prominently along the top surface of the melting target object so as to be capable of heating the entire melting target object uniformly with this combustion flame. Further, in the intermediate area between the inlet and the outlet, it is desired that the combustion flame extend obliquely upward so as to prevent this combustion flame from coming into contact with the melting target object, though not so significantly obliquely upward as is the case with the vicinity of the inlet.

For this reason, with the conventional melting furnace combustion device, the forming condition of the combustion flame is switchedly changed between the vicinity of the inlet and the vicinity of the outlet, by changing the disposing angle of the fuel injection nozzle. However, such changing of the disposing angle of the fuel injection nozzle would render the installment work of the combustion device troublesome.

The present invention has been made in view of the above-described state of the art. Its object is to provide a combustion device for a melting furnace, the device being capable of favorably effecting heating of a melting target object with radiant heat of combustion flame and heating of the ceiling portion of the melting furnace with the radiant heat of the combustion flame.

Another object of the present invention is to provide a melting furnace capable of forming combustion flame suitable for heating, while facilitating the installment work of the combustion device.

Means for Achieving the Object

In a combustion device for a heating furnace according to the present invention, wherein a fuel injection nozzle for injecting gas fuel to a combustion space upwardly of an area in a melting tank where a melting target object is present is configured to inject the gas fuel from a lateral portion of the combustion space; and a combustion air feeding portion for feeding combustion air along an obliquely downward direction into the combustion space is provided at an upper portion of the fuel injection nozzle, according to the first characterizing feature:

in the fuel injection nozzle, a plurality of fuel injecting portions including a plurality of fuel injection orifices disposed side by side in the horizontal direction as seen from the direction of fuel injection are formed side by side in the vertical direction;

the fuel injection orifices of the plurality of fuel injecting portions are formed radially side by side as seen in a lateral view, with a direction along a middle angle in the angular range between the fuel injection direction of the uppermost fuel injection orifice and the fuel injection direction of the lowermost fuel injection orifice being directed obliquely upward; and of the plurality of fuel injecting portions, the fuel injection orifices of the upper fuel injecting portion are formed radially side by side as seen in the plane view and the fuel injection orifices of the lower fuel injecting portion are formed side by side either radially or in parallel with each other.

That is, since the fuel injection orifices of the plurality of fuel injecting portions formed vertically side by side in the fuel injection nozzle are formed side by side radially as seen in the lateral view, the gas fuel will be injected radially with vertical extension, so that vertically extended combustion flame may be formed.

And, in addition to the radially juxtaposed arrangement of the fuel injection orifices of the plurality of fuel injecting portions as seen in the lateral view, a direction along a middle angle in the angular range between the fuel injection direction of the uppermost fuel injection orifice and the fuel injection direction of the lowermost fuel injection orifice is directed obliquely upwards. Hence, the gas fuel injected radially with the vertical extension is injected obliquely upwards as a whole, so that there is formed a combustion flame with obliquely upward extension.

Therefore, the combustion flame which is formed when the gas fuel injected from the fuel injection orifices of the plurality of fuel injecting portions formed vertically side by side is combusted with the air fed from the combustion air feeding portion will be formed with obliquely upward extension as a whole and with vertical extension. With the obliquely upward extension as a whole, contact with the melting target object is avoided and at the same time, with the vertical extension, both the heating of the melting target object with the radiant heat of the combustion flame and the heating of the ceiling portion of the melting furnace can be effected in a favorable manner.

Incidentally, the condition where the direction along a middle angle in the angular range between the fuel injection direction of the uppermost fuel injection orifice and the fuel injection direction of the lowermost fuel injection orifice is directed obliquely upward can occur in the following three cases.

The first case is when all of the plurality of fuel injection orifices are formed with the obliquely upward orientation. The second case is when the fuel injection direction of the lowermost fuel injection orifice of the plurality of fuel injection orifices is the horizontal direction and all the other fuel injection orifices are formed with the obliquely upward orientation.

The third case is when the fuel injection directions of one or more lower fuel injection orifices are formed with obliquely downward orientation, all the other fuel injection orifices excluding the fuel injection orifices with the obliquely downward orientation are formed with obliquely upward orientation, or when the fuel injection direction of the lowermost fuel injection orifice of the fuel injection orifices with the obliquely downward orientation is horizontal direction, and all the other fuel injection orifices are formed with the obliquely upward orientation.

One conceivable example of the case when it is needed to provide fuel injection orifices with the downward oriented fuel injection direction like the third case described above is when there is a significant vertical distance between the area of the presence of the melting target object in the melting tank and the installment position of the fuel injection nozzle. And, in providing the fuel injection direction of lower fuel injection orifice with the obliquely downward orientation, how much downward orientation should be given thereto will be determined based on the vertical distance between the area of the presence of the melting target object in the melting tank and the installment position of the fuel injection nozzle.

Moreover, according to the first characterizing feature, of the plurality of fuel injecting portions, the fuel injection orifices of the upper fuel injecting portion are formed radially side by side as seen in the plane view and the fuel injection orifices of the lower fuel injecting portion are formed side by side either radially or parallel with each other as seen in the plane view. Therefore, the arrangement restricts formation of unnecessarily upwardly extended combustion flame, whereby both the heating of the melting target object with the radiant heat of the combustion flame and the heating of the ceiling portion of the melting furnace with the radiant heat of the combustion flame may be effected in a favorable manner.

That is, in general, when gas fuel is combusted with combustion air, for instance, the feeding rate of the combustion air obliquely downwardly fed from the combustion air feeding portion will be 8-15 m/S, whereas the injection rate of the gas fuel injected from the fuel injection nozzle will be 30 to 50 m/S, such that the injection rate of the gas fuel is a few times higher than the feeding rate of the combustion air.

While the injection rate of the gas fuel is a few times higher than the feeding rate of the combustion air, of the plurality of fuel injecting portions, the fuel injection orifices of the upper fuel injecting portion are formed side by side radially as seen in the plane view. Therefore, the gas fuel injected will be dispersed in the right/left direction, so that combustion of the injected gas fuel with this fuel pushing up the combustion air fed from the combustion air feeding portion is prevented; hence, formation of unnecessarily upwardly extended combustion flame can be restricted.

Incidentally, of the plurality of fuel injecting portions, if the fuel injection orifices of the upper side fuel injecting portion are formed side by side in parallel with each other as seen in the plane view, the injected gas fuel will flow in a concentrated manner without being dispersed in the right/left direction, so that the fuel will be combusted with pushing up the combustion air. As a result, unnecessarily upwardly extended combustion flame will be formed, thus inviting inconvenience of this flame coming into contact with the ceiling portion of the melting furnace, thus leading to premature damage of this ceiling. Hence, it becomes impossible to effect favorably the heating of the melting target object with the radiant heat of the combustion flame and the heating of the ceiling portion of the melting furnace with the radiant heat of the combustion flame.

The gas fuel injected from the fuel injection orifices of the lower side fuel injecting portion of the plurality of fuel injecting portions is oriented more downwards than the gas fuel injected from the fuel injection orifices of the upper side fuel injecting portion, so that the former gas fuel will push up the combustion air less likely. Therefore, in accordance with a heating condition required, the fuel injection orifices of the lower side fuel injecting portion are to be formed side by side radially or parallel with each other, as seen in the plane view.

Incidentally, if the fuel injection orifices of the lower side fuel injecting portion are formed side by side radially as seen in the plane view, it becomes possible to form a combustion flame extending prominently along the lateral width direction. If the fuel injection orifices of the lower side fuel injecting portion are formed side by side in parallel with each other as seen in the plane view, it becomes possible to form a combustion flame which extends sufficiently along the gas fuel injection direction.

In short, according to the first characterizing feature of the present invention, it is possible to provide a combustion device for a melting furnace, the device being capable of favorably effecting heating of a melting target object with radiant heat of combustion flame and heating of the ceiling portion of the melting furnace with the radiant heat of the combustion flame.

According to the second characterizing feature of the present invention, in addition to the first characterizing feature described above, of the plurality of fuel injecting portions, the fuel injection orifices of the upper side fuel injecting portion have a greater diameter than the fuel injection orifices of the lower side fuel injecting portion.

That is, since of the plurality of fuel injecting portions, the fuel injection orifices of the upper side fuel injecting portion have a greater diameter than the fuel injection orifices of the lower side fuel injecting portion, the injection rate of the gas fuel injected from the upper side fuel injecting portion of the plurality of fuel injecting portions can be set lower than the injection rate of the gas fuel injected from the lower side fuel injecting portion of the plurality of fuel injecting portions.

With the above arrangement of setting the injection rate of the gas fuel injected from the upper side fuel injecting portion of the plurality of fuel injecting portions lower than the injection rate of the gas fuel injected from the lower side fuel injecting portion of the plurality of fuel injecting portions, it becomes possible to reliably avoid the combustion of the gas fuel injected from the fuel injection orifices of the upper side fuel injecting portion of the plurality of fuel injecting portions, with this gas fuel pushing up the combustion air fed form the combustion air feeding portion.

In short, according to the second characterizing feature of the present invention, in addition to the function/effect by the above-described first characterizing feature, it is possible to provide a combustion device for a melting furnace, capable of reliably avoiding the combustion of the gas fuel injected from the fuel injection orifices of the upper side fuel injecting portion of the plurality of fuel injecting portions, with this gas fuel pushing up the combustion air fed form the combustion air feeding portion.

According to the third characterizing feature of the present invention, in addition to the first characterizing feature or the second characterizing feature described above, there is provided a varying/adjusting means for varying/adjusting the gas feeding ratios for the plurality of vertical stages of the fuel injecting portions.

That is, with the varying/adjusting means, it is possible to vary/adjust the gas feeding ratios for the plurality of vertical stages of the fuel injecting portions.

That is, it is possible to adjust the ratio to a condition of the upper side fuel injecting portion of the plurality of vertical stages of the fuel injecting portions providing a greater gas fuel injection amount than the lower side fuel injecting portion, a condition of the lower side fuel injecting portion of the plurality of vertical stages of the fuel injecting portions providing a greater gas fuel injection amount than the upper side fuel injecting portion, or to a condition of the upper side fuel injecting portion of the plurality of vertical stages of the fuel injecting portions providing an equal gas fuel injection amount to the lower side fuel injecting portion.

Incidentally, the condition of the upper side fuel injecting portion of the plurality of vertical stages of the fuel injecting portions providing an equal gas fuel injection amount to the lower side fuel injecting portion is not limited to the case of the injection amounts of the gas fuels being exactly same, but includes a case that there exists a difference in the gas fuel injection amount between the upper side fuel injecting portion and the lower side fuel injecting portion within a range corresponding to 5% of the injection amount of the gas fuel injected from the fuel injection nozzle. That is, the above condition includes also a condition of the gas fuel injection amounts of the upper side fuel injecting portion and the lower side fuel injection portion being approximately equal to each other.

And, with the setting to the condition of the upper side fuel injecting portion of the plurality of vertical stages of the fuel injecting portions providing a greater gas fuel injection amount than the lower side fuel injecting portion, the combustion flame will be extended obliquely upwards. With setting to the condition of the lower side fuel injecting portion of the plurality of vertical stages of the fuel injecting portions providing a greater gas fuel injection amount than the upper side fuel injecting portion, the combustion flame will be extended prominently along the horizontal direction.

Further, with setting to the condition of the upper side fuel injecting portion of the plurality of vertical stages of the fuel injecting portions providing an equal gas fuel injection amount to the lower side fuel injecting portion, although the combustion flame will not be oriented so significantly upward as the case of setting to the condition of the upper side fuel injecting portion providing a greater gas fuel injection amount than the lower side fuel injecting portion, the combustion flame will be extended obliquely upward and also this combustion flame will be extended along the horizontal direction, though not so prominently as the case of setting to the condition of the lower side fuel injecting portion providing a greater gas fuel injection amount than the upper side fuel injecting portion.

Therefore, in the case of constructing the melting furnace with disposing the melting furnace combustion devices side by side on the lateral side of the melting tank along the juxtaposition direction for charging raw material and the outlet for taking out the melted product in the melting tank, if the above-described combustion device for a melting furnace is installed, it becomes possible to form a combustion flame desirable for that melting furnace.

That is, in the vicinity of the inlet, the melting target object before being melted will be present with vertical (height) unevenness, so it is desired that the combustion flame extend obliquely upward so as to prevent this combustion flame from coming into contact with the melting target object. Hence, at the time of installment in the vicinity of the inlet, with setting to the condition of the upper side fuel injecting portion of the plurality of vertical stages of the fuel injecting portions providing a greater gas fuel injection amount than the lower side fuel injecting portion, it is possible to form such combustion flame which extends obliquely upwards.

Further, in the vicinity of the outlet, the melting target object after being melted will be present with its top surface being flat. So, it is desired that the combustion flame extends as prominently as possible along the top surface of the melting target object so as to be capable of heating the entire melting target object uniformly with this combustion flame. Hence, at the time of installment in the vicinity of the outlet, with setting to the condition of the lower side fuel injecting portion of the plurality of vertical stages of the fuel injecting portions providing a greater gas fuel injection amount than the upper side fuel injecting portion, it is possible to form such combustion flame which has a prominent extension along the horizontal direction.

Further, in the intermediate area between the inlet and the outlet, the melting target object in the middle of its melting is present with some vertical unevenness remaining, but not so significant vertical unevenness as that present in the vicinity of the inlet. So, it is desired that the combustion flame extend obliquely upward so as to prevent this combustion flame from coming into contact with the melting target object, though not so significantly obliquely upward as is the case with the vicinity of the inlet, but the flame should also extend along the horizontal direction, though not so prominently as the case of setting to the condition of the lower side fuel injecting portion providing a greater gas fuel injection amount than the upper side fuel injecting portion.

In short, according to the third characterizing feature of the present invention, in addition to the function/effect by the first or second characterizing feature described above, it is possible to provide a combustion device for a melting furnace, which can form a combustion flame suitable for the installment position of the melting tank.

According to the present invention, there is provided a melting furnace, wherein three or more combustion devices for a melting furnace according to any one of the first through third characterizing features of the present invention disposed side by side at lateral portions of the melting tank along the juxtaposition direction of the inlet for charging the raw material and the outlet for taking out the melted object in the melting tank;

of the plurality of combustion devices juxtaposed, the gas feeding ratios for the combustion device disposed in the vicinity of the inlet for the plurality of vertical stages of the fuel injecting portions are set such that the ratio for the upper side fuel injecting portion is greater than the ratio for the lower side fuel injecting portion;

of the plurality of combustion devices juxtaposed, the gas feeding ratios for the combustion device disposed at an intermediate position between the inlet and the outlet for the plurality of vertical stages of the fuel injecting portions are set such that the ratio for the upper side fuel injecting portion is equal to the ratio for the lower side fuel injecting portion; and of the plurality of combustion devices juxtaposed, the gas feeding ratios for the combustion device disposed in the vicinity of the outlet for the plurality of vertical stages of the fuel injecting portions are set such that the ratio for the lower side fuel injecting portion is greater than the ratio for the upper side fuel injecting portion.

That is, of the plurality of combustion devices juxtaposed, the gas feeding ratios for the combustion device disposed in the vicinity of the inlet for the plurality of vertical stages of the fuel injecting portions are set such that the ratio for the upper side fuel injecting portion is greater than the ratio for the lower side fuel injecting portion, so that the gas fuel injection amount of the upper side fuel injecting portion is greater than the gas fuel injection amount of the lower side fuel injecting portion, whereby the combustion flame will extend obliquely upwards.

Further, of the plurality of combustion devices juxtaposed, the gas feeding ratios for the combustion device disposed in the vicinity of the outlet for the plurality of vertical stages of the fuel injecting portions are set such that the ratio for the lower side fuel injecting portion is greater than the ratio for the upper side fuel injecting portion, so that the gas fuel injection amount of the lower upper side fuel injecting portion is greater than the gas fuel injection amount of the upper side fuel injecting portion, whereby the combustion flame will extend prominently along the horizontal direction.

Further, of the plurality of combustion devices juxtaposed, the gas feeding ratios for the combustion device disposed at an intermediate position between the inlet and the outlet for the plurality of vertical stages of the fuel injecting portions are set such that the ratio for the upper side fuel injecting portion is equal to the ratio for the lower side fuel injecting portion, so that the gas fuel injection amount of the upper side fuel injecting portion is equal to the gas fuel injection amount of the lower side fuel injecting portion, whereby the combustion flame will extend obliquely upward, though not so mush as the case of setting of the gas fuel injection amount of the upper side fuel injecting portion being greater than the gas fuel injection amount of the lower side fuel injecting portion and will extend also along the horizontal direction, through not so prominently as the case of setting of the gas fuel injection amount of the lower side fuel injecting portion being greater than the gas fuel injection amount of the upper side fuel injecting portion.

Incidentally, the condition of the upper side fuel injecting portion of the plurality of vertical stages of the fuel injecting portions providing an equal gas fuel injection amount to the lower side fuel injecting portion is not limited to the case of the injection amounts of the gas fuels being exactly same, but includes a case that there exists a difference in the gas fuel injection amount between the upper side fuel injecting portion and the lower side fuel injecting portion within a range corresponding to 5% of the injection amount of the gas fuel injected from the fuel injection nozzle. That is, the above includes also a condition of the gas fuel injection amounts of the upper side fuel injecting portion and the lower side fuel injection portion being approximately equal to each other.

In the vicinity of the inlet, the melting target object before being melted will be present with vertical unevenness. Hence, it is desired that the combustion flame extend obliquely upward so as to prevent this combustion flame from coming into contact with the melting target object. With the combustion device disposed in the vicinity of the inlet, such combustion flame extending obliquely upwards can be formed.

Further, in the vicinity of the outlet, the melted melting target object will be present with its top surface being flat. Hence, it is desired that the combustion flame extends as prominently as possible along the top surface of the melting target object so as to be capable of heating the entire melting target object uniformly with this combustion flame. With the combustion device disposed adjacent the outlet, such combustion flame extending prominently along the horizontal direction can be formed.

Moreover, in the intermediate area between the inlet and the outlet, the melting target object in the middle of its melting is present with some vertical unevenness still remaining, but not so significant vertical unevenness as that present in the vicinity of the inlet. Hence, it is desired that the combustion flame extend obliquely upward so as to prevent this combustion flame from coming into contact with the melting target object, though not so significantly obliquely upward as is the case with the vicinity of the inlet. With the combustion device disposed in the intermediate area between the inlet and the outlet, such combustion flame extending obliquely upward though not so significantly obliquely upward as the combustion flame formed by the combustion device disposed in the vicinity of the inlet and extending along the horizontal direction, though not prominently as the combustion flame formed by the combustion device disposed in the vicinity of the outlet.

Therefore, in constructing a melting furnace where a plurality of melting furnace combustion devices are disposed side by side at the lateral portions of the melting tank along the juxtaposition direction of the inlet for charging raw material and the outlet for taking out the melted object in the melting tank, a combustion flame desired for this melting furnace can be formed.

Moreover, as the combustion flame is formed according to the installment position relative to the melting tank, by setting the gas feeding ratios for the melting furnace combustion device relative to the melting tank, the plurality of the melting furnace combustion devices to be juxtaposed at the lateral portions of the melting tank can be installed under a same condition. As a result, the installment work of the combustion devices can be simplified.

Incidentally, in setting the gas feeding ratios for the plurality of vertical stages of the fuel injecting portions of the fuel injection nozzle according to the installment position of the melting furnace combustion device relative to the melting tank, in the case of the melting furnace combustion device according to the third characterizing feature, with the varying/adjusting means provided therein, it is possible to vary/adjust the gas feeding ratios for the plurality of vertical stages of the fuel injecting portions. Whereas, in the case of an arrangement not equipped with such varying/adjusting means, the gas feeding ratio can be set by e.g. incorporating a throttle for setting the gas feeding ratio in a gas fuel feeding path to the plurality of vertical stages of the fuel injecting portions.

In short, with the melting furnace of the present invention, the installment work of the combustion devices can be simplified and at the same time, a combustion flame suitable for heating can be formed.

MODES OF EMBODYING THE INVENTION

[Embodiments]

Next, embodiments of the present invention will be explained with reference to the accompanying drawings.

Figure 1:
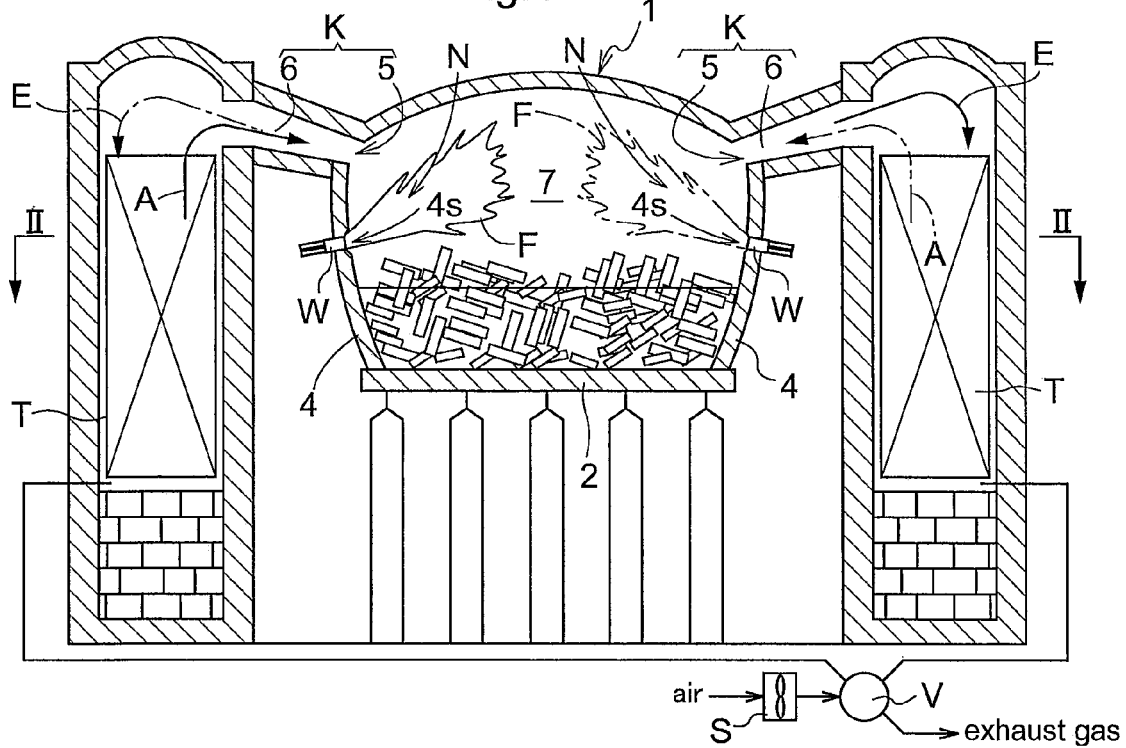
[FIG. 1] is a front view in vertical section of a glass melting furnace.
Figure 2:
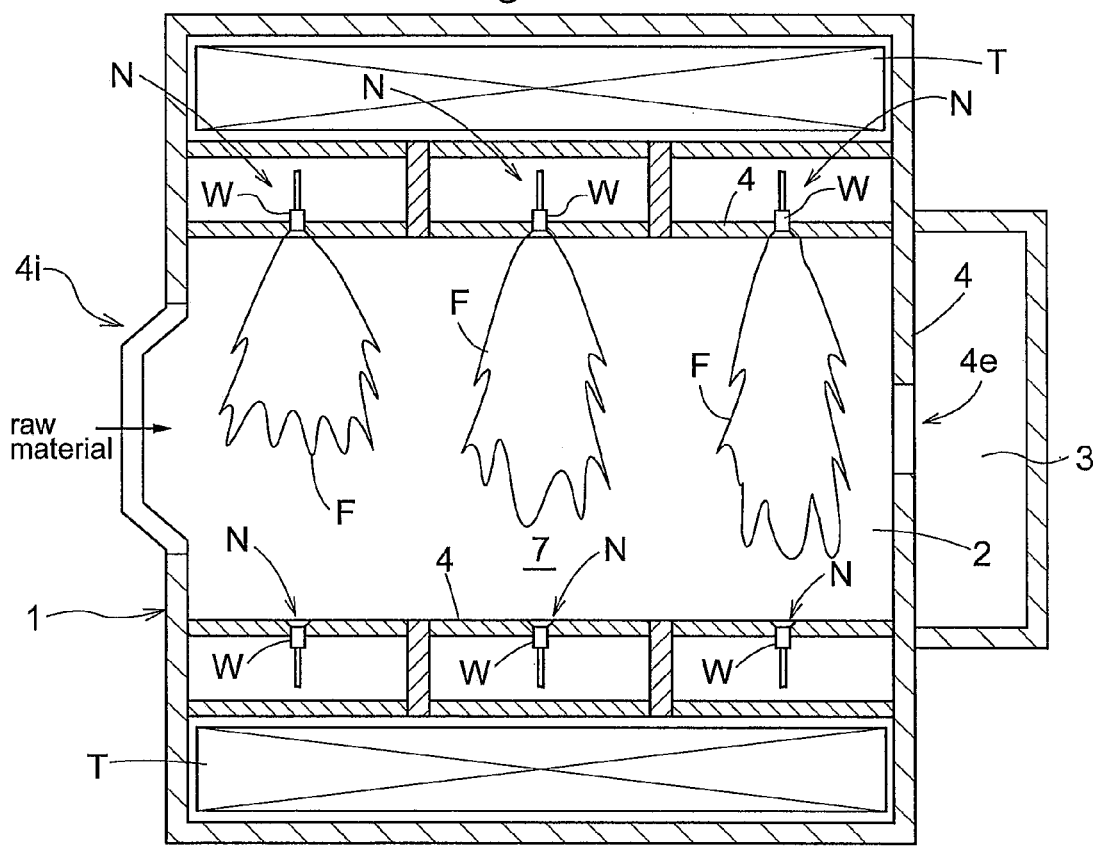
[FIG. 2] is a view taken along a line II-II in FIG. 1.
Figure 3:
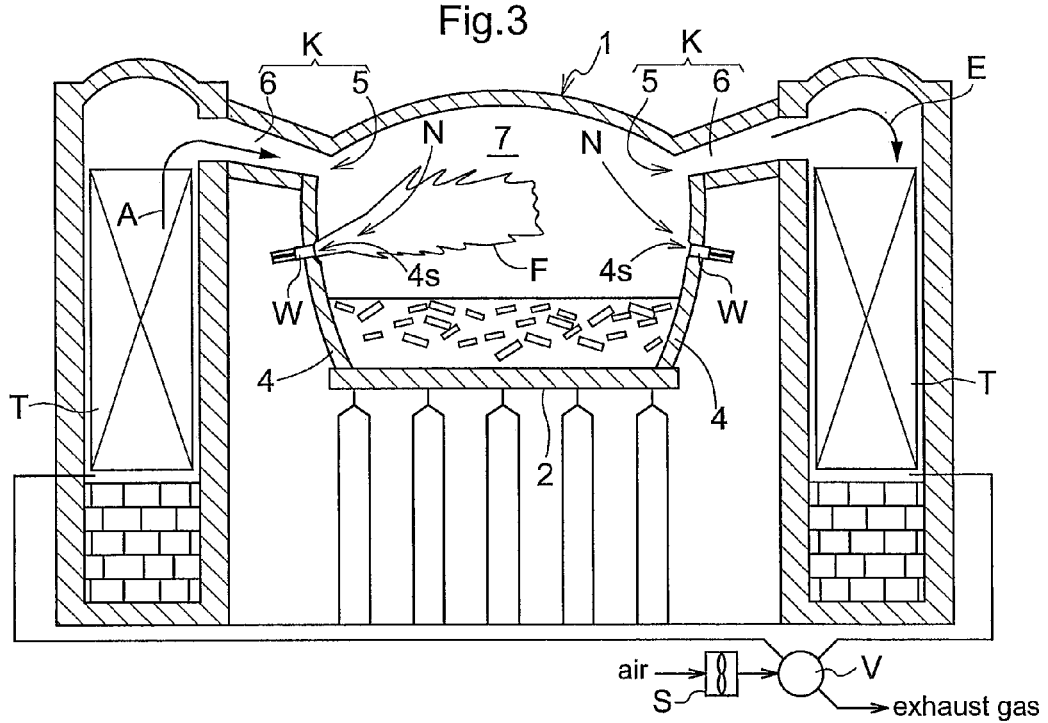
[FIG. 3] is a front view in vertical section of the glass melting furnace.

As shown in FIG. 1 and FIG. 2, a glass melting furnace, as a "melting furnace", includes an arch-shaped furnace body 1, and a melting tank 2 disposed at a lower portion of the furnace body 1, the melting tank 2 having a rectangular shape as seen in the plane view. A furnace wall 4 which forms and delimits the melting tank 2 forms, in a front face portion thereof, an inlet 4$i$ for charging glass raw material as a "melting target object" and forms, in a rear face portion thereof, an outlet 4$e$ for taking out melted glass therefrom. On the outside of the furnace wall portion forming the outlet 4$e$, there is provided a work tank 3 communicated with the melting tank 2 via the outlet 4$e$. Combustion devices N for a melting furnace are provided on the opposed lateral portions of the melting tank 2 for combusting a gas fuel in a combustion space formed upwardly of an area in the melting tank 2 where the melting target object is present. With this glass melting furnace in operation, an amount of glass raw material charged through the inlet 4$i$ is melted in the melting tank 2 and caused to flow toward the work tank 3, so that clean melted glass is guided through the outlet 4$e$ to the work tank 3.

The combustion devices N are provided such that three of them are juxtaposed on each opposed lateral side of the melting tank 2, along the direction of juxtaposition of the inlet 4$i$ and the outlet 4$e$ (the flowing direction of the glass raw material). And, an arrangement is provided such that the three combustion devices on the left side and the three combustion devices N on the right side effect combustion alternatively from each other every a predetermined period (e.g. every about 15 to 30 minutes).

On each of the right/left lateral side of the furnace body 1, there is provided a heat accumulating chamber T which extends along the front/rear direction of the melting tank. And, as will be described later, each combustion device N is configured to combust a gas fuel with a combustion air A which is preheated to a high temperature (1000 to 1200° C.) through the heat accumulating chamber T.

The heat accumulating chamber T is configured to accumulate heat contained in a combustion exhaust gas E after combustion by the combustion device N which is caused to pass therethrough.

Figure 5:
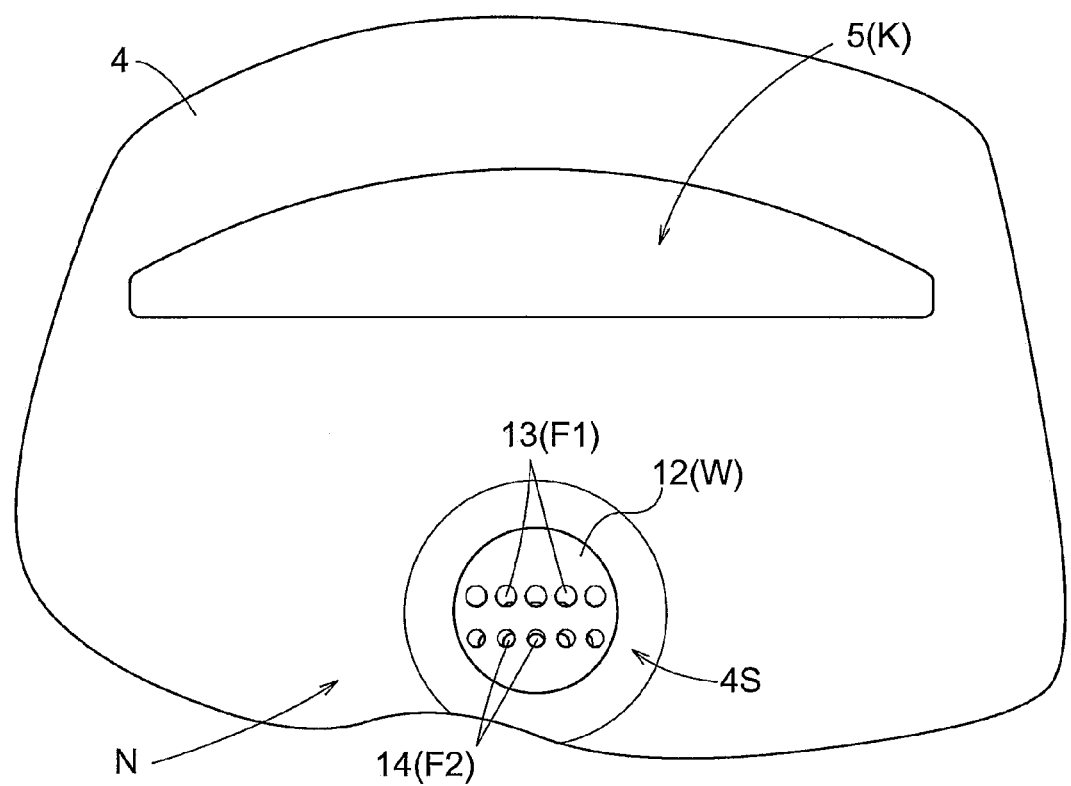
[FIG. 5] is a side view showing principal portions of the glass melting furnace.

Each combustion device N, as shown also in FIG. 5, includes a fuel feeding portion W for injecting gas fuel into the combustion space from a lateral portion of the combustion space and a combustion air feeding portion K provided upwardly of the fuel feeding portion W and configured for feeding the combustion air obliquely downwards into the combustion space.

The combustion air feeding portion K consists essentially of an air orifice 5 opened in the furnace wall 4 and an air feeding path 6 which communicates the heat accumulating chamber T to the air orifice 5 and is configured, as described above, for feeding the combustion air A which is preheated to a high temperature as passing through the heat accumulating chamber T to a combustion area for the gas fuel. Incidentally, the feeding rate of the combustion air ranges e.g. from 8 to 15 m/S.

Referring to the cross sectional shape of the air feeding path 6 as well as the shape of the air orifice 5 formed at the leading end thereof, as shown in FIG. 5, the shape is a semi-oval shape consisting of a straight lower edge and an upper edge which projects in an upward curve to interconnect the opposed ends of the straight lower edge.

And, the lower edge of the air feeding path 6 is formed with 10 degrees inclination relative to the horizontal direction as seen in the side view and the top portion of the upper edge of the air feeding path is formed with 20 degrees inclination relative to the horizontal direction as seen in the side view.

As shown in FIG. 1, there is provided a path switching mechanism V for switching over between a condition wherein the air of a blower S is fed to one of the left and right heat accumulating chambers T and exhaust gas E discharged from the other heat accumulating chamber T is discharged to the outside and a condition wherein the air of the blower S is fed to the other of the left and right heat accumulating chambers T and exhaust gas E discharged from the one heat accumulating chamber T is discharged to the outside. As this path switching mechanism V switches over between the condition of feeding combustion air to the left side three combustion devices N and the condition of feeding combustion air to the right side three combustion devices N, there is effected the above-switchover between the condition of the left side three combustion devices N effecting combustion and the condition of the right side three combustion devices N effecting combustion.

Figure 6:
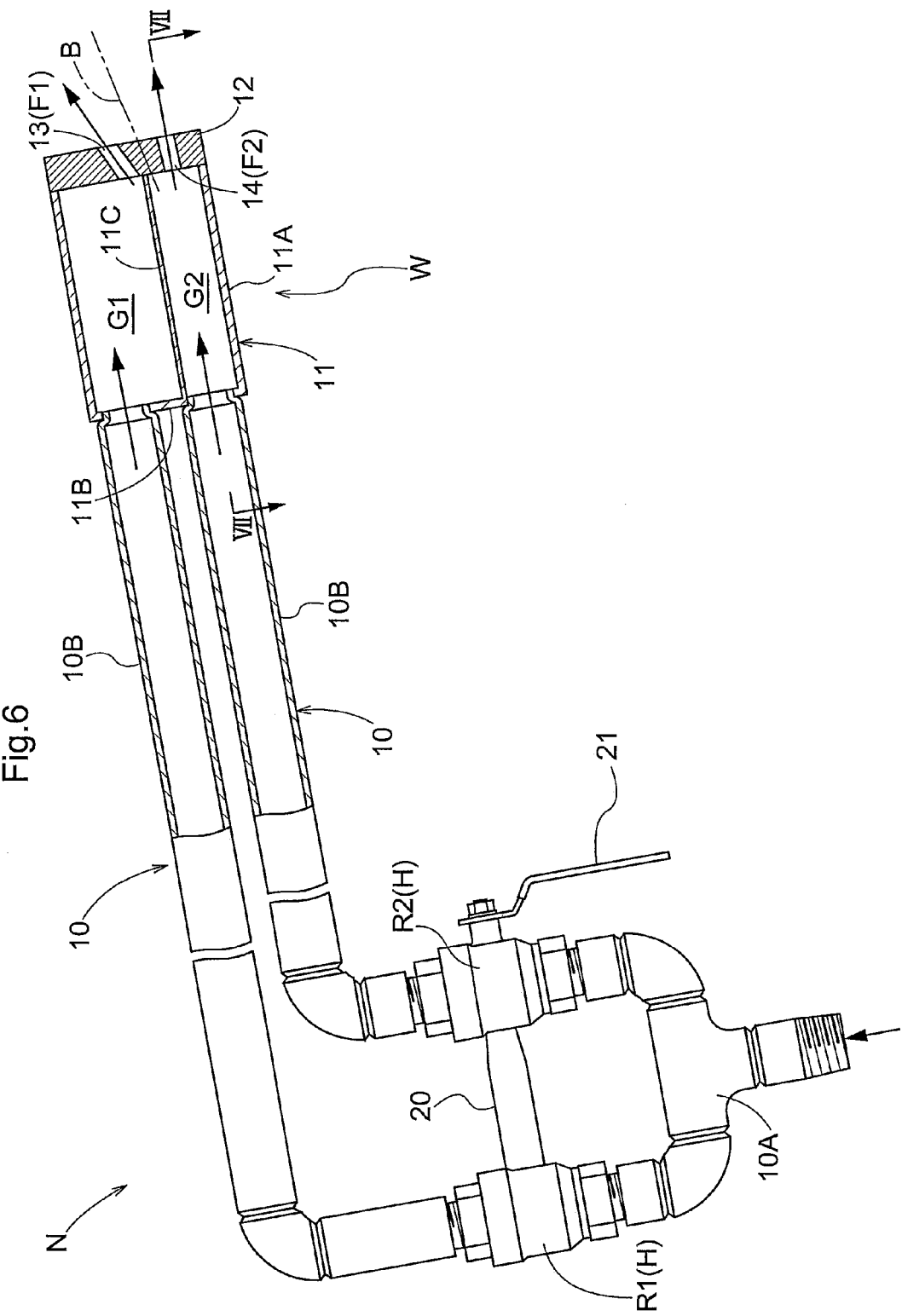
[FIG. 6] is a partially cutaway side view of a fuel feeding portion.

As shown in FIG. 6, the fuel feeding portion W includes a gas feeding pipe portion 10 for receiving the gas fuel from a gas fuel feeding source, a gas feeding chamber portion 11 connected to the leading end of this gas feeding pipe portion 10, and a fuel injection nozzle 12 connected to the leading end of the gas feeding chamber portion for injecting gas fuel into the combustion space.

That is, the fuel feeding portion W comprises a unit of an integral assembly of the gas feeding pipe portion 10, the gas feeding chamber portion 11 and the fuel injection nozzle 12. And, this fuel feeding portion W is mounted to the furnace wall 4, with its fuel injection nozzle 12 being inserted into a mounting hole 4s defined in the furnace wall 4.

Incidentally, the fuel feeding portion W is to be mounted in such a manner that the longitudinal direction of the gas feeding pipe portion 10 is inclined 5 to 15 degrees upwards relative to the horizontal direction. Incidentally, in the illustrated example of this embodiment, there is provided 10 degrees of upward inclination.

Figure 8:
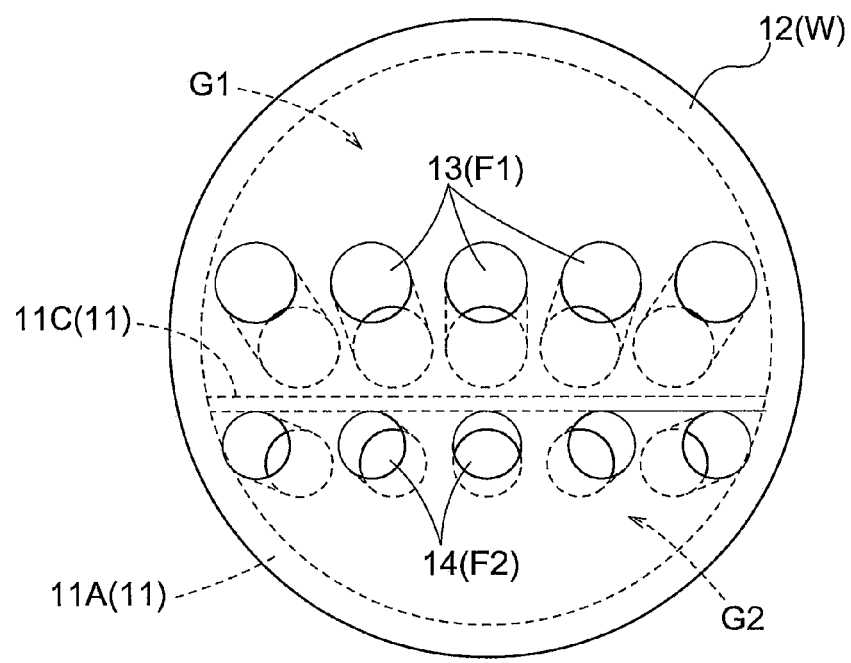
[FIG. 8] is a front view of a fuel injection nozzle.

The fuel injection nozzle 12, as shown also in FIG. 8, forms two fuel injecting portions F1, F2 juxtaposed along the vertical direction, with each one of these two fuel injecting portions F1, F1 including a plurality of fuel injection orifices 13, 14 disposed side by side along the horizontal direction as seen from the direction of fuel injection.

And, the fuel injection orifices 13, 14 of the two fuel injecting portions F1, F2 are formed side by side radially as seen in the side view.

Further, fuel injection directions of the fuel injection orifices 13, 14 of the two fuel injecting portions F1, F2 are all formed with obliquely upward orientation, with a direction (this direction will be referred to as the "central direction" for short, hereinafter) B along a middle angle in the angular range between the fuel injection direction of the upper side fuel injection orifices 13 as the uppermost fuel injection orifices and the fuel injection direction of the lower side fuel injection orifices 14 as the lowermost fuel injection orifices is oriented obliquely upwards.

Figure 7:
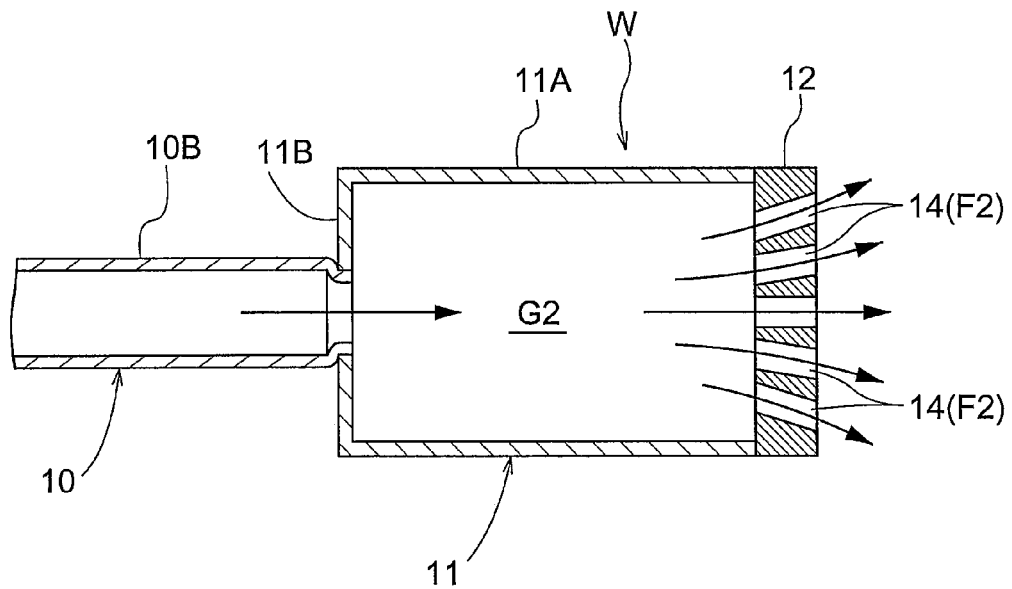
[FIG. 7] is a view taken along a line VII-VII in FIG. 6.

Further, as shown in FIG. 7, of the two fuel injecting portions F1, F2, the fuel injection orifices 14 of the lower side fuel injecting portion F2 are formed radially side by side as seen in the plane view. Similarly, the fuel injection orifices 13 of the upper side fuel injecting portion F1 are formed radially side by side as seen in the plane view.

Of the two fuel injecting portions, the fuel injection orifices 13 of the upper side fuel injecting portion F1 are formed with a diameter equal to or less than 10% greater than the fuel injection orifices 14 of the lower side fuel injecting portion F2.

Incidentally, the fuel injection orifices 13, 14 of the two fuel injecting portions F1, F2 are formed such that the length of the holes is two times or more greater than the diameter of the holes.

The gas feeding chamber portion 11, as shown in FIG. 6 and FIG. 7, is divided or sectioned into two fuel feeding chambers G1, G2 in correspondence with the two fuel injecting portions F1, F2 of the fuel injection nozzle 12.

More particularly, the leading end of a main body portion 11A in the form of a quadrangular tube is connected to the rear face portion of the fuel injection nozzle 12 and in the back portion of the cylindrical main body portion 11A, there is provided a back wall portion 11B to which the gas feeding pipe portion 10 is to be connected. And, the inside of the quadrangular-tubular main body portion 11A is divided and sectioned vertically by means of a partitioning wall 11C.

The gas feeding pipe portion 10 includes, as principal components thereof, a base end pipe portion 10A which extends in two forked portions from the joint portion of the gas feeding pipe (not shown) and a pair of pipe path portions 10B connected respectively to the two fuel feeding chambers G1, G2 of the gas feeding chamber portion 10. Between the base end pipe portion 10A and the pair of pipe path portions 10B, there are provided flow rate adjusting valves R1, R2.

There is provided a varying/adjusting means H for varying/adjusting the gas feeding ratios for the two fuel injecting portions F1, F2 of the fuel injection nozzle 12.

This varying/adjusting means H is constituted by using the flow rate adjusting valves R1, R2 provided between the base end pipe portion 10A and the pair of pipe path portions 10B.

More particularly, the pair of flow rate adjusting valves R1, R2 are coupled with each other such that both of them may be opened/closed together (simultaneously) by means of a coupling shaft 20. And, a reciprocable pivot operation type operational lever 21 is provided for opening/closing these flow rate adjusting valves R1, R2 together (simultaneously). Further, an arrangement is provided for changing the opening degrees of the pair of flow rate adjusting valves R1, R2 in the opposite directions such that as the operational lever 21 is pivoted to one side, the opening degree of one of them is increased and the opening degree of the other of them is decreased, and also that as the operational lever 21 is pivoted to the other side, the opening degree of the other of them is increased and the opening degree of the one of them is decreased.

And, the gas feeding ratios for the two fuel injecting portions F1, F2 of the fuel injection nozzles 12 of the three combustion devices N provided side by side on each of the left and right lateral sides of the melting tank 2 are set as follows by the varying/adjusting means H.

Namely, of the three combustion devices N juxtaposed along the direction of the juxtaposition of the inlet 4i and the outlet 4e (the flowing direction of the glass raw material), the gas feeding ratios for the two fuel injecting portions F1, F2 of the fuel injection nozzle 12 of the combustion device N located in the vicinity of the inlet 4i are set such that the gas feeding ratio for the upper side fuel injecting portion F1 is greater than the gas feeding ratio for the lower side fuel injecting portion F2. Specifically, the ratios are set as 8:2.

Further, of the three combustion devices N juxtaposed along the direction of the juxtaposition of the inlet 4i and the outlet 4e (the flowing direction of the glass raw material), the gas feeding ratios for the two fuel injecting portions F1, F2 of the fuel injection nozzle 12 of the combustion device N located in the intermediate position between the inlet 4i and the outlet 4e are set such that the gas feeding ratio for the upper side fuel injecting portion F1 is equal to the gas feeding ratio for the lower side fuel injecting portion F2.

Incidentally, the above-described setting of the gas feeding ratios for the two fuel injecting portions F1, F2 being same for the upper side fuel injecting portion F1 and the lower side fuel injecting portion F2 is not limited to the setting of the gas fuel injection amounts of the upper side fuel injecting portion F1 and the lower side fuel injecting portion F2 being equal to each other. The setting is understood to be inclusive also of such a setting that the gas fuel injection amount of the upper side fuel injecting portion F1 is different from the gas fuel injection amount of the lower side fuel injecting portion F2 within a range corresponding to 5% of the injection amount of the gas fuel injected from the fuel injection nozzle. Namely, the above setting is understood to include also a setting of the gas fuel injection amounts of the upper side fuel injecting portion and the lower side fuel injecting portion being approximately equal to each other.

Further, of the three combustion devices N juxtaposed along the direction of the juxtaposition of the inlet 4i and the outlet 4e (the flowing direction of the glass raw material), the gas feeding ratios for the two fuel injecting portions F1, F2 of the fuel injection nozzle 12 of the combustion device N located in the vicinity of the outlet 4e are set such that the gas feeding ratio for the lower side fuel injecting portion is greater than the gas feeding ratio for the upper side fuel injecting portion. Specifically, the ratios are set as 3:7.

Therefore, as shown in FIGS. 1 through 4, the flame formed by the combustion device disposed near the inlet 4i is shorter than the flame formed by the combustion device N located at the intermediate position between the inlet 4i and the outlet 4e and the flame formed by this combustion device N located at the intermediate position between the inlet 4i and the outlet 4e is shorter than the flame formed by the combustion device N disposed near the outlet 4e. In this way, the lengths of the combustion flames formed by the respective combustion devices N are rendered different from each other.

Figure 4:
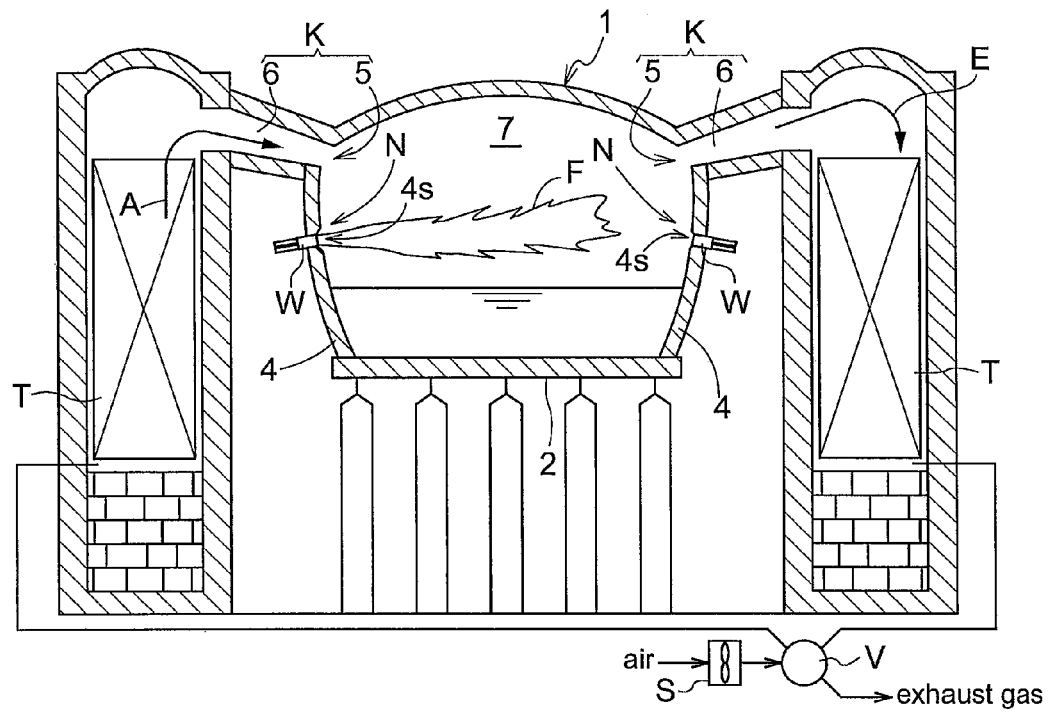
[FIG. 4] is a front view in vertical section of the glass melting furnace.

Further, the flame formed by the combustion device N disposed adjacent the inlet 4i does not extend downwards, but tends to extend upwards, as shown in FIG. 1. Whereas, the flame formed by the combustion device N disposed adjacent the outlet 4e does not extend upward, but extends prominently along the area of the presence of the melting target object in the melting tank 2, as illustrated in FIG. 4.

And, the flame formed by the combustion device N disposed at the intermediate position between the inlet 4i and the outlet 4e extends slightly upwards, not as much as the upward orientation of the flame formed by the combustion device N disposed adjacent the inlet 4i, but more upwards than the flame formed by the combustion device N disposed adjacent the outlet 4e.

Therefore, in the vicinity of the inlet 4i, the melting target object (glass raw material) before being melted is present with vertical unevenness. Hence, in order to avoid contact between the combustion flame and this melting target object (glass raw material), it is desired that the combustion flame extend obliquely upwards. And, such flame with obliquely upward extension can be formed by the combustion device N disposed in the vicinity of the inlet 4i.

Further, in the vicinity of the outlet 4e, the melted melting target object (glass raw material) is present with its top surface being formed flat. So, in order to allow uniform heating of this melting target object (glass raw material) with the combustion flame, it is desired that this combustion flame extends as prominently as possible along the top surface of the melting target object. And, such combustion flame extending prominently along the horizontal direction can be formed by the combustion device N disposed in the vicinity of the outlet 4e.

Moreover, at the intermediate position between the inlet 4i and the outlet 4e, the melting target object (glass raw material) in the course of its melting is present with some vertical unevenness still remaining, though not so much vertical unevenness as the vicinity of the inlet 4i. Hence, it is desired that the combustion flame extend slightly upwards, though not so much upward as the vicinity of the inlet 4i, but should still extend obliquely upward in order to avoid contact with the melting target object (glass raw material). And, the combustion device N disposed at the intermediate position between the inlet 4i and the outlet 4e can form such combustion flame which extends obliquely upwards, though not so much obliquely upward as the combustion flame formed by the combustion device N disposed in the vicinity of the inlet 4i, but extends horizontally, though not so prominently as the combustion flame formed by the combustion device disposed in the vicinity of the outlet 4e.

In short, the three combustion devices N disposed side by side along the direction of the juxtaposition of the inlet 4i for charging the raw material into the melting tank 2 and the outlet 4e for taking out the melted object therefrom can form respective combustion flames desirable for the respective melting furnaces.

[About Experiment Results]

Figure 15:
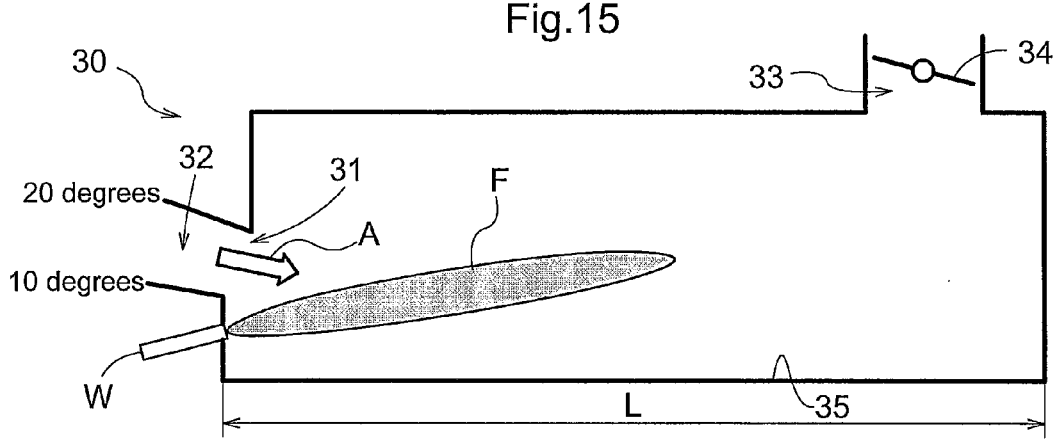
[FIG. 15] is a schematic front view of a testing device.
Figure 16:
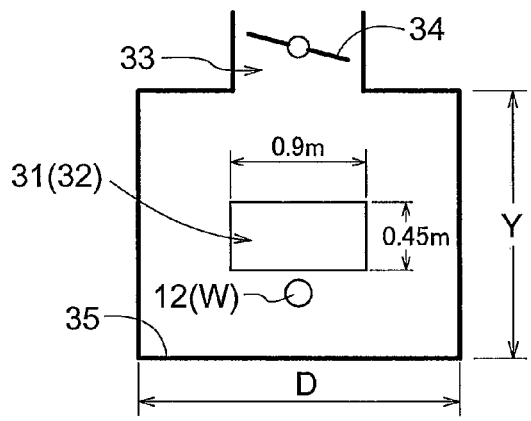
[FIG. 16] is a schematic side view of the testing device.

Next, there will be explained results of experiments in which combustion was effected in a testing heating furnace 30 mounting a fuel injection portion W described in the foregoing embodiment, as shown in FIG. 15 and FIG. 16. The testing heating furnace 30 has a depth D of 1.8 m, a height Y of 1.6 m and a lateral width L of 8.8 m.

The cross sectional shapes of an air orifice 31 for feeding combustion air A and of an air feeding path 32 continuous from the air orifice 31 are horizontally elongated rectangular shapes as shown in FIG. 16. Specifically, the lateral width is 0.9 m, the height is 0.45 m and the bottom face of the air feed path 32 has 10 degrees of inclination relative to the horizontal direction and the top face thereof has 20 degrees of inclination relative to the horizontal direction.

The combustion air A is air at 1000° C. which is fed at the rate of 4 m/S.

The flue 33 incorporates a damper 34 for adjusting the gas exhaust resistance. Further, the bottom of the heating furnace 30 is formed simply as a floor face 35.

Figure 17:
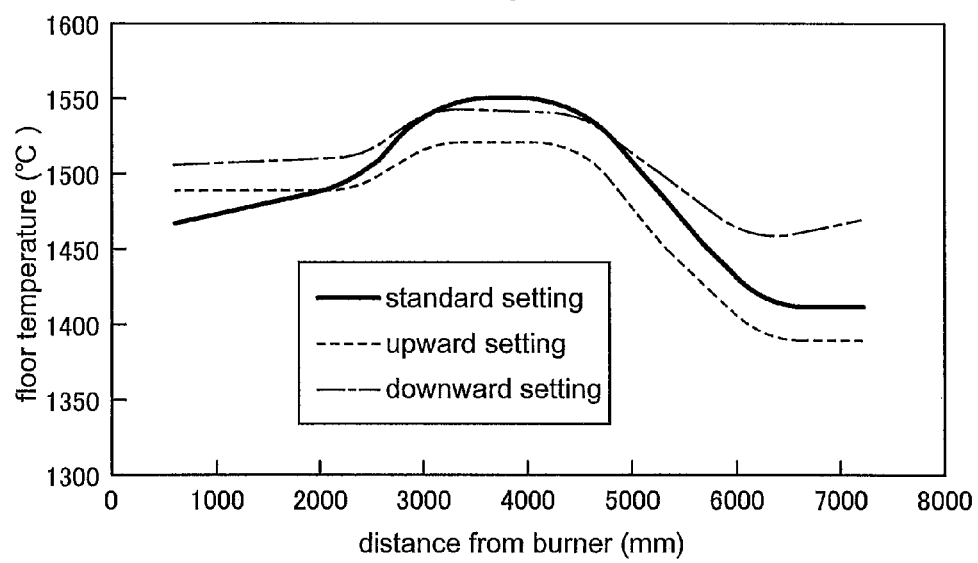
[FIG. 17] is a view showing experiment results relating to ceiling temperature.
Figure 18:
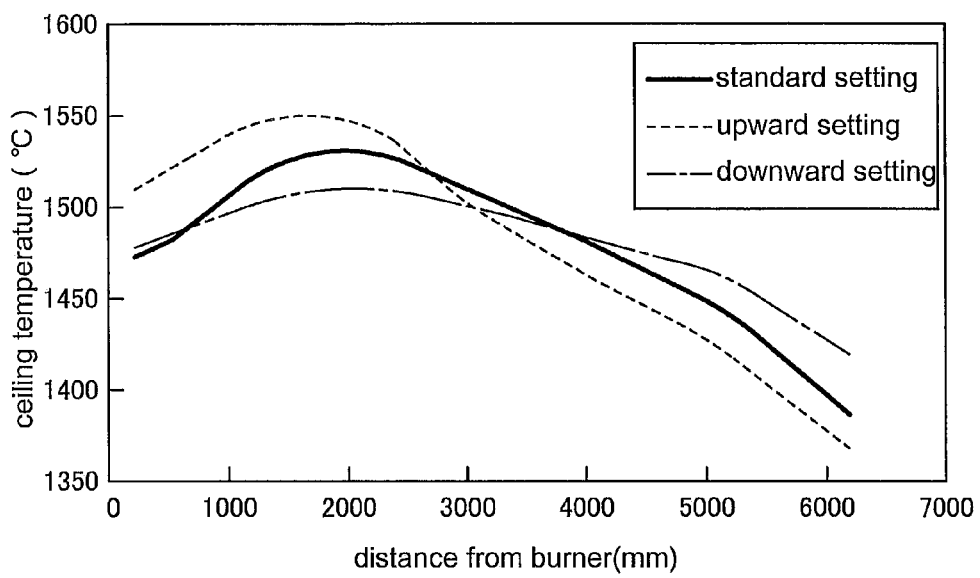
[FIG. 18] is a view showing experiment results relating to floor surface temperature.
Figure 19:
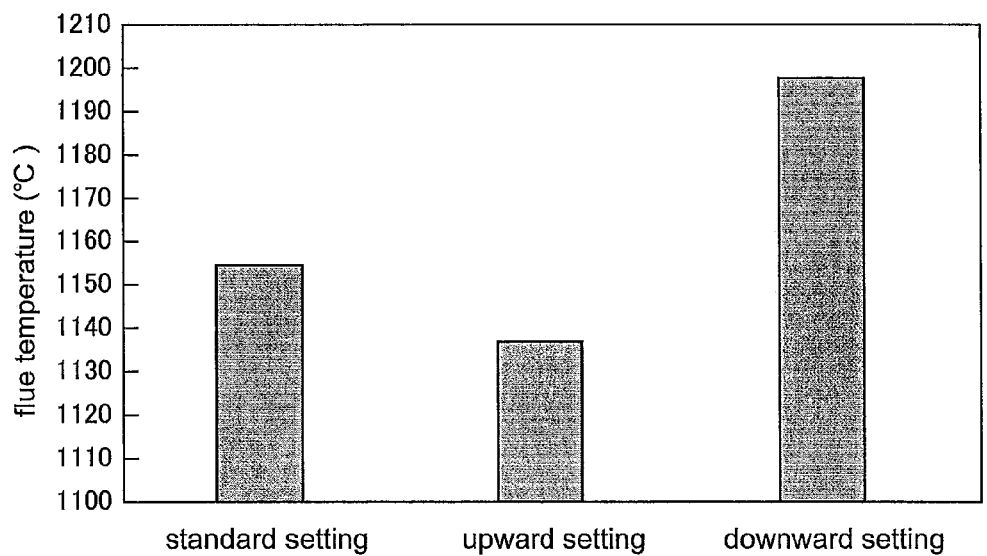
[FIG. 19] is a view showing experiment results relating to flue temperature.

With using this testing system, the floor temperature, the ceiling temperature and the flue temperature of this testing heating furnace 30 were determined, with effecting combustions with changing the gas feeding ratios for the two fuel injecting portions F1, F2 of the fuel injection nozzle 12 by the varying/adjusting means H provided in the fuel feeding portion W, to selectively provide a condition wherein the gas feeding ratio for the upper side fuel injecting portion F1 is greater than the gas feeding ratio for the lower side fuel injecting portion F2, specifically, at the ratio of 8:2 (this will be referred to as the "upward setting" hereinafter), a further condition wherein the gas feeding ratios for the upper side fuel injecting portion F1 and the lower fuel injecting portion F2 are equal to each other (this will be referred to as the "standard setting" hereinafter), and a still further condition wherein the gas feeding ratio for the lower side fuel injecting portion F2 is greater than the gas feeding ratio for the upper side fuel injecting portion F1, specifically, at the ratio of 3:7 (this will be referred to as the "downward setting" hereinafter). The results are shown in FIGS. 17 through 19.

From these experiment results, it was confirmed that the flames formed by the respective combustion devices N heat the floor and the ceiling appropriately.

Meanwhile, with the downward setting, the flue temperature is higher. This is because the flame extends prominently along the floor face 35 and extends into the flue without much heating the ceiling.

Incidentally, when the amount of NOx contained in the exhaust gas flowing in the flue was determined, it was found that the amount was within a permissible range.

From the above experiment results, as explained in details in the foregoing embodiment, it was confirmed that the respective combustion devices N disposed side by side along the direction of juxtaposition of the inlet 4i for charging raw material to the melting tank 2 and the outlet 4e for taking out the melted object therefrom can form combustion flames desirable for the respective melting furnace.

[Further Embodiment of Fuel Feeding Portion]

Next, a further embodiment of the fuel feeding portion W will be explained.

Figure 9:
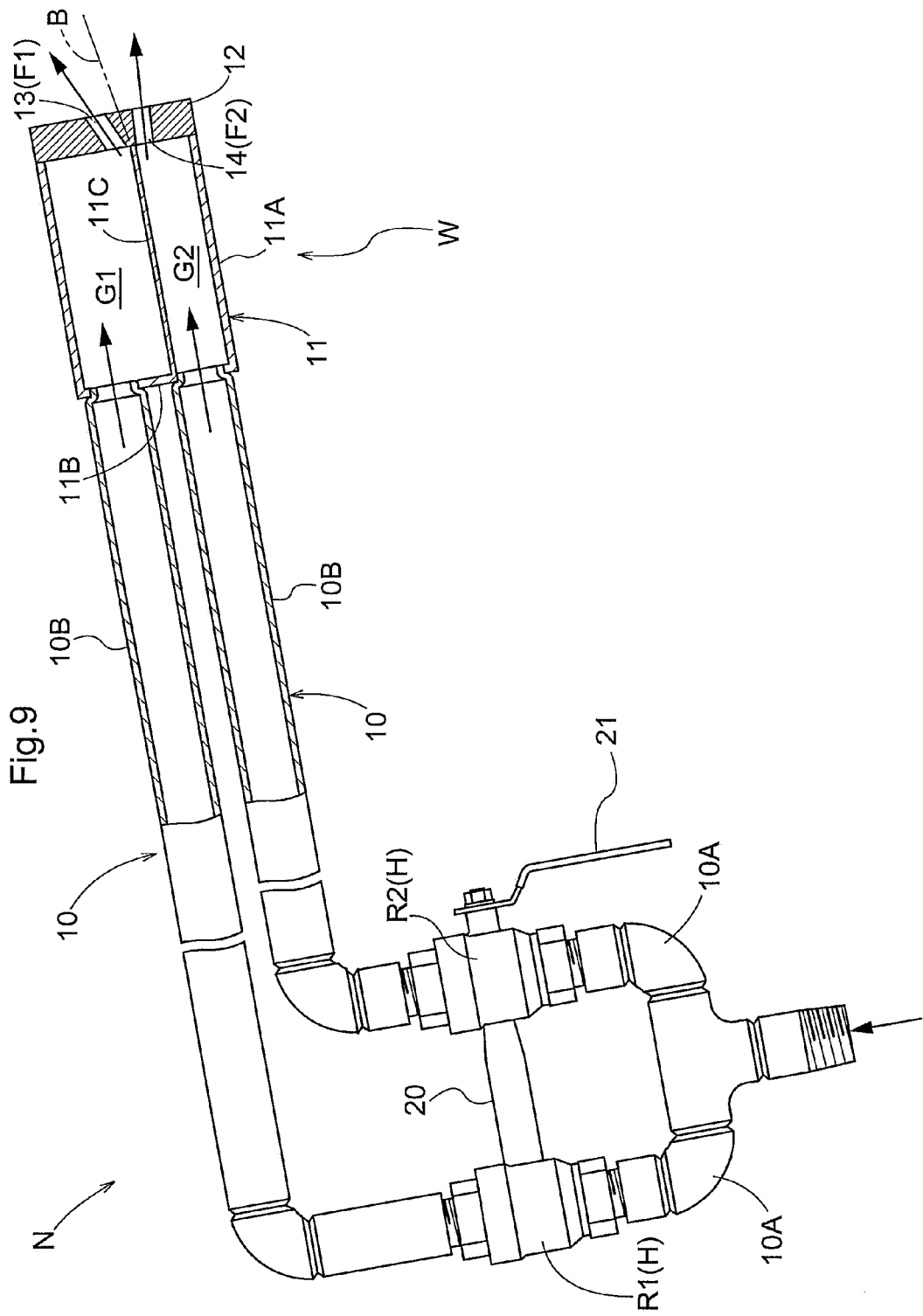
[FIG. 9] is a partially cutaway side view showing a fuel feeding portion relating to a further embodiment.
Figure 10:
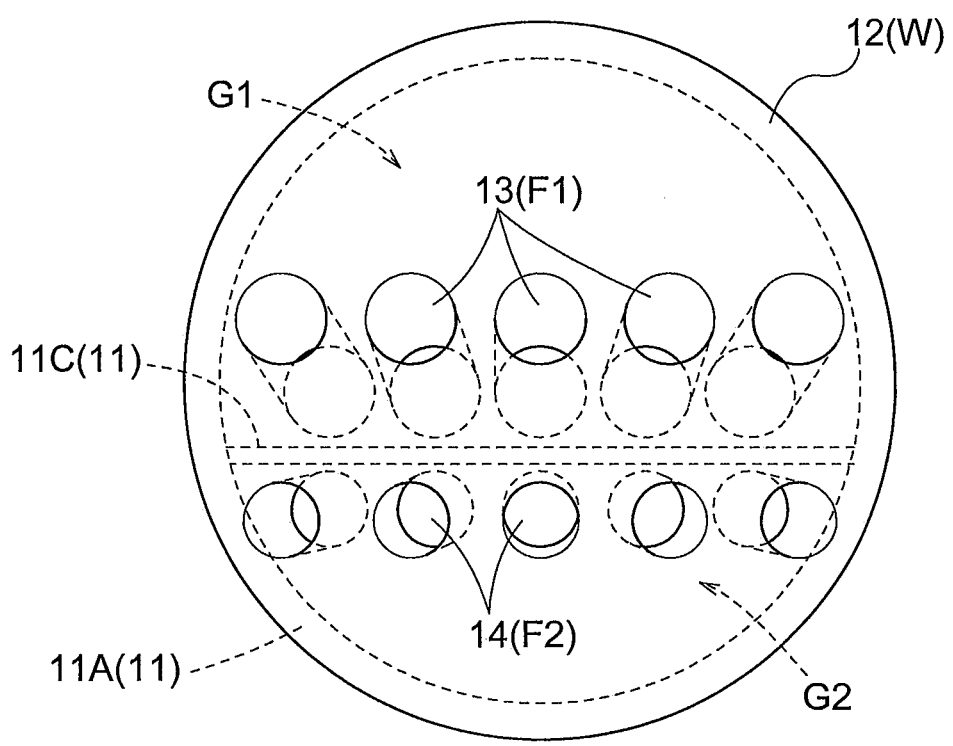
[FIG. 10] is a front view showing a fuel injection nozzle relating to a further embodiment.

As shown in FIG. 9 and FIG. 10, in this further embodiment, like the foregoing embodiment, the fuel injection nozzle 12 forms two fuel injecting portions F1, F2 vertically juxtaposed. This further embodiment is similar to the foregoing embodiment in that the fuel injection orifices 13, 14 of the two fuel injecting portions F1, F2 are disposed side by side radially as viewed in the side view and the direction (the "central direction" hereinafter) B along the middle angle of the angular range between the fuel injection direction of the upper side fuel injection orifices 13 as the uppermost fuel injection orifices and the fuel injection direction of the lower side fuel injection orifices 14 as the lowermost fuel injection orifices is oriented obliquely upwards.

The further embodiment is also similar to the foregoing embodiment in that the plurality of fuel injection orifices 13, 14 of the two fuel injecting portions F1, F2 are provided radially side by side as viewed in the plane view.

The difference from the foregoing embodiment is that while the fuel injection direction of the fuel injection orifices 13 of the upper side fuel injecting portion F1 of the two fuel injecting portions F1, F2 is obliquely upward, while the fuel injection direction of the fuel injection orifices 14 of the lower side fuel injecting portion F2 is slightly obliquely upwards, but near the horizontal direction.

Figure 11:
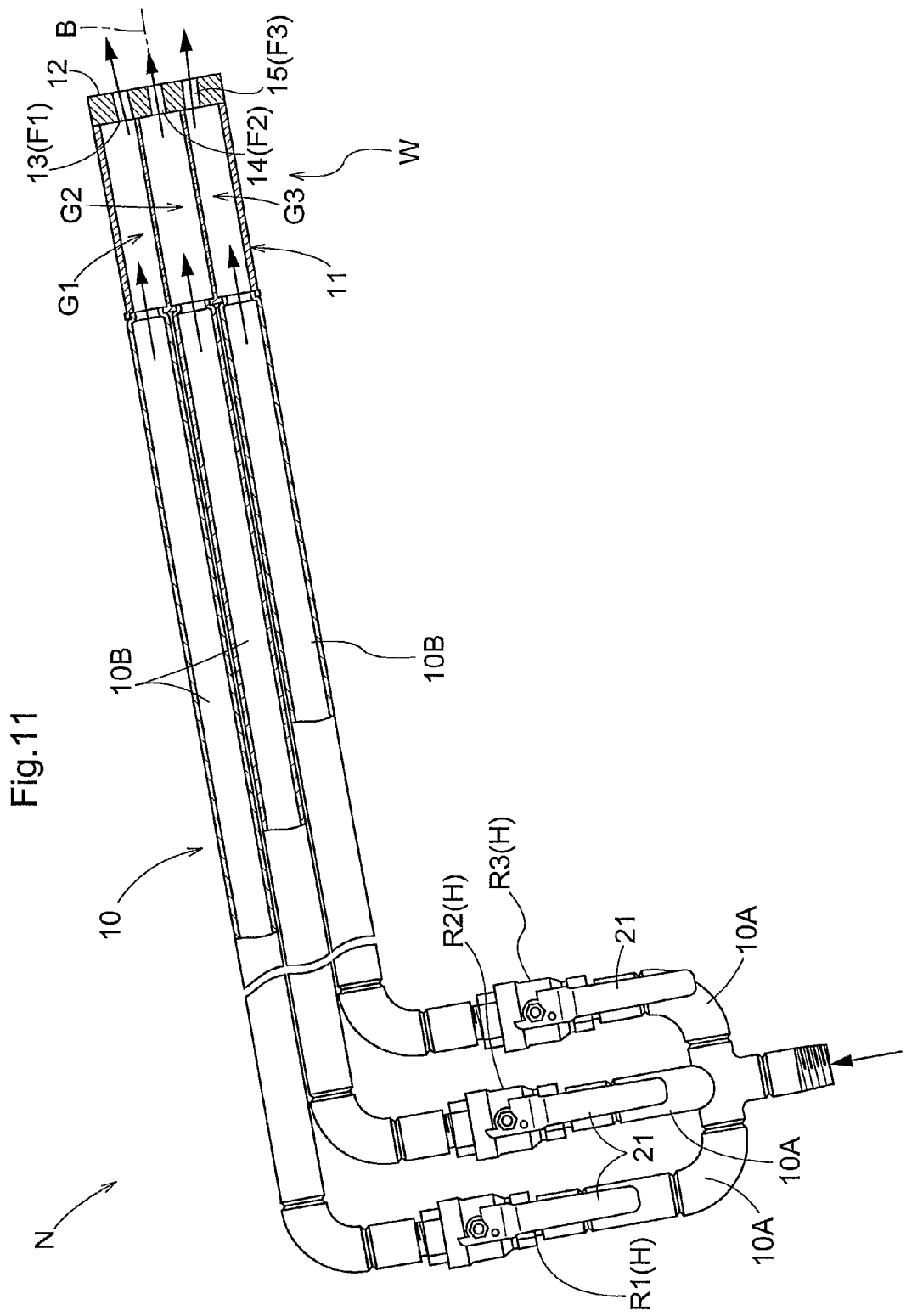
[FIG. 11] is a partially cutaway side view showing a fuel feeding portion in the further embodiment.
Figure 12:
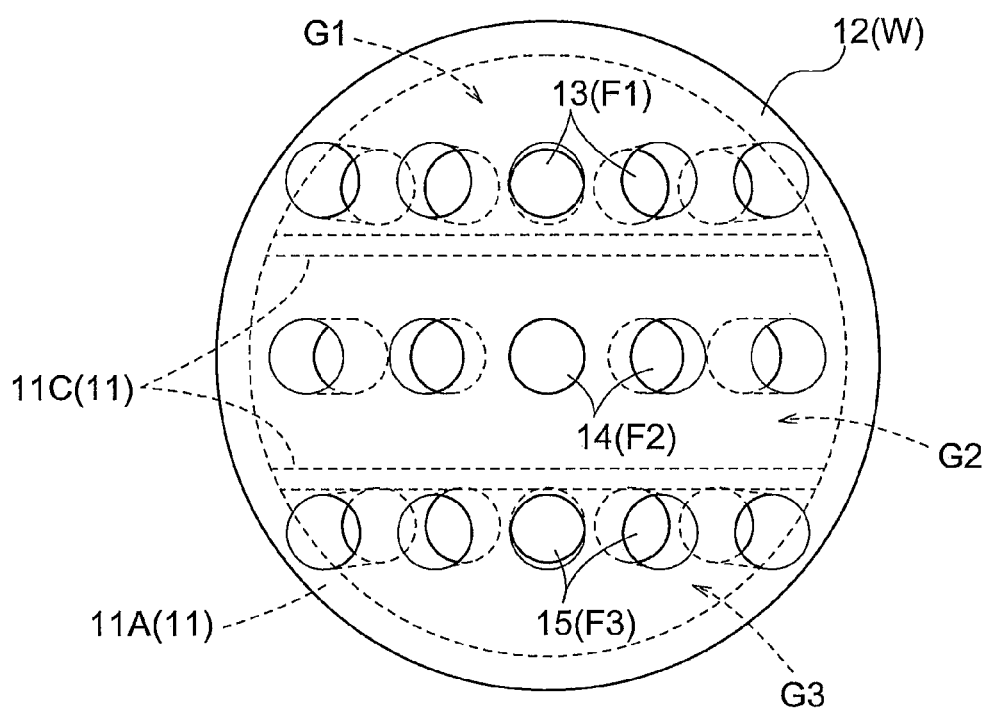
[FIG. 12] is a front view showing a fuel injection nozzle in a further embodiment.

As shown in FIG. 11 and FIG. 12, in this embodiment, the fuel injection nozzle 12 forms three fuel injecting portions F1, F2, F3 juxtaposed vertically. The respective three fuel injecting portions F1, F2, F3 include a plurality of fuel injection orifices 13, 14, 15 disposed side by side along the horizontal direction, as viewed along the direction of fuel injection. Further, the plurality of fuel injection orifices 13, 14 of the three fuel injecting portions F1, F2, F3 are formed side by side radially as seen in the plane view.

And, the fuel injection orifices 13, 14, 15 of the three fuel injecting portions F1, F2, F3 are disposed side by side radially as seen in the side view and also the direction (the "central direction" hereinafter) B along the middle angle of the angular range between the fuel injection direction of the upper side fuel injection orifices 13 as the uppermost fuel injection orifices and the fuel injection direction of the lower side fuel injection orifices 15 as the lowermost fuel injection orifices is oriented obliquely upwards.

The fuel injection directions of the fuel injection orifices 13, 14 of the upper side fuel injecting portion F1 and the vertically intermediate fuel injecting portion F2 of the three fuel injecting portions F1, F2, F3 are obliquely upwards, whereas the fuel injection direction of the fuel injection orifices 15 of the lower side fuel injecting portion F3 is also obliquely upwards, but near the horizontal direction.

Further, in this embodiment, the gas feeding pipe portion 10 includes three pipe portions 10B and the gas feeding chamber portion 11 is divided into three combustion chambers G1, G2, G3 and three flow rate adjusting valves R1, F2, R3 constituting the varying/adjusting means H are provided in correspondence with the respective three pipe portions 10B described above to be operable independently of each other.

Figure 13:
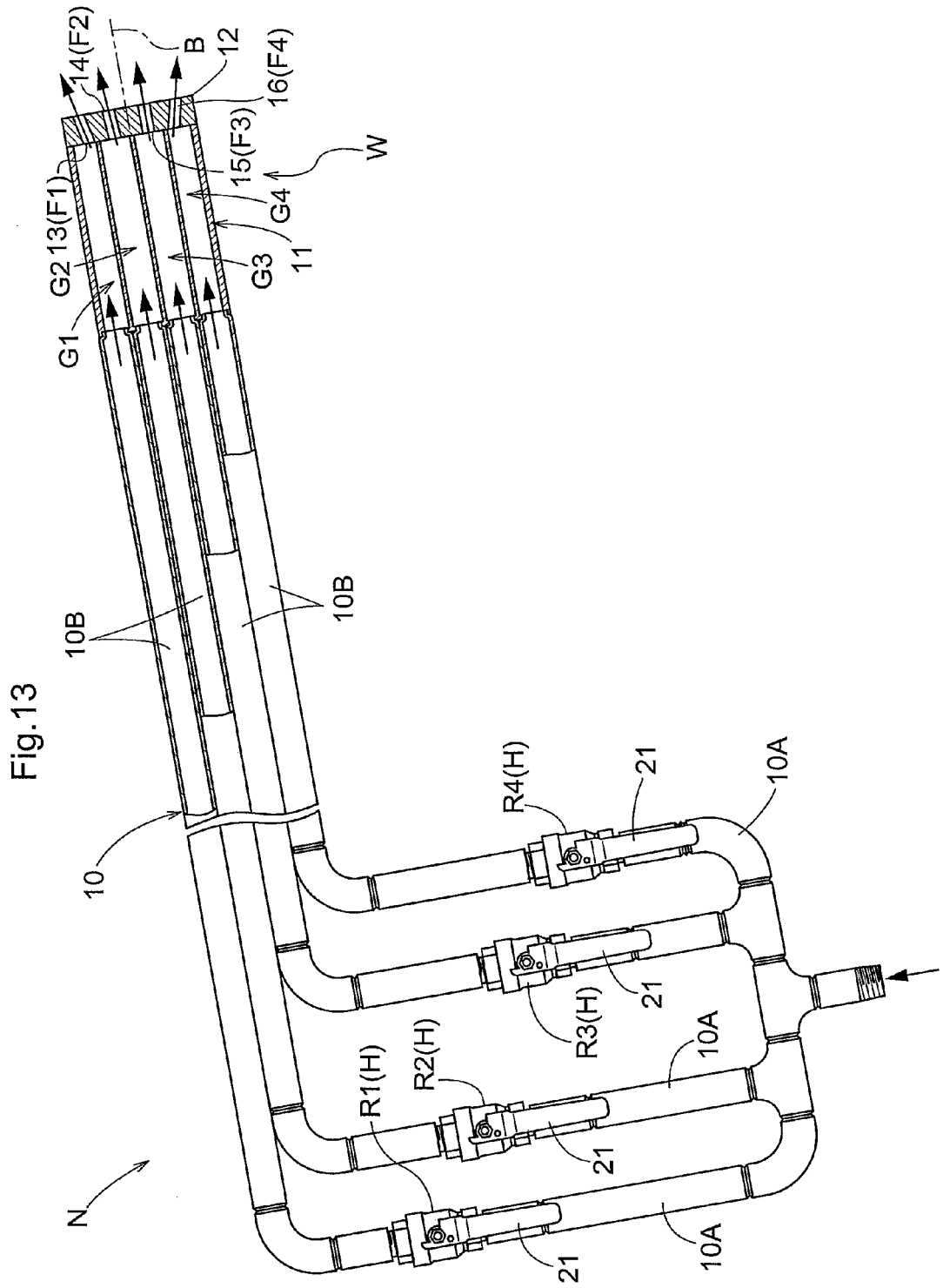
[FIG. 13] is a partially cutaway side view showing a fuel feeding portion in a further embodiment.
Figure 14:
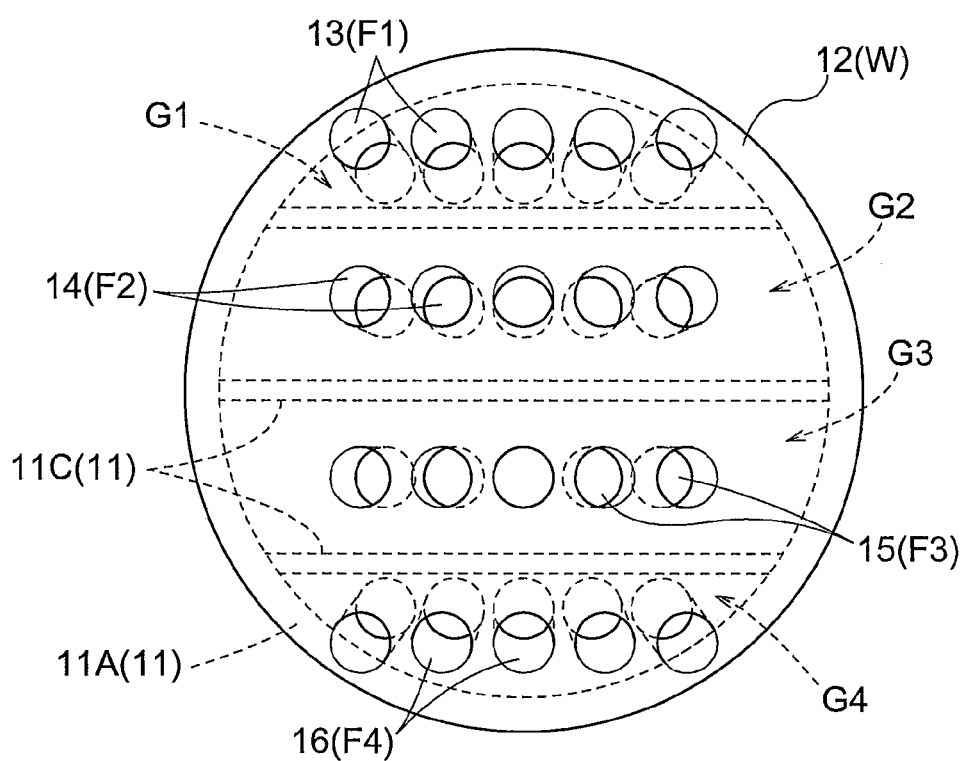
[FIG. 14] is a front view showing a fuel injection nozzle in a further embodiment.

As shown in FIG. 13 and FIG. 14, in this embodiment, the fuel injection nozzle 12 forms four fuel injecting portions F1, F2, F3, F4 juxtaposed vertically and each one of these four fuel injecting portions F1, F2, F3, F4 includes a plurality of fuel injection orifices 13, 14, 15, 16 formed side by side along the horizontal direction as seen from the direction of fuel injection.

And, the fuel injection orifices 13-16 of the four fuel injecting portions F1, F2, F3, F4 are juxtaposed radially as seen in the side view, and also the direction (the "central direction" hereinafter) B along the middle angle in the angular range between the fuel injection direction of the upper side fuel injection orifices 13 as the uppermost fuel injection orifices and the fuel injection direction of the lower side fuel injection orifices 16 as the lowermost fuel injection orifices is obliquely upward.

The fuel injection directions of the fuel injection orifices 13, 14, 15 of the upper side fuel injecting portion F1 and the vertically intermediate fuel injecting portions F2, F3 of the four fuel injecting portions F1-F4, are obliquely upwards, whereas the fuel injection direction of the fuel injection orifices 16 of the lower side fuel injecting portion F4 is near the horizontal direction, but obliquely downwards.

Further, in this embodiment, four pipe portions 10B and the gas feeding chamber portion 11 is divided into four combustion chambers G1, G2, G3, G4 and four flow rate adjusting valves R1, F2, R3, R4 constituting the varying/adjusting means H are provided in correspondence with the respective four pipe portions 10B described above to be operable independently of each other.

[Further Embodiments]

Next, further embodiments will be explained.

(A) With the combustion device for a melting furnace of the present invention, it is preferred that these devices should be disposed side by side along the direction of juxtaposition (the flowing direction of the glass raw material) of the inlet for charging raw material and the outlet for taking out the melted object in the melting tank. However, it is not absolutely needed to dispose them as above, but may be used in various configurations of melting furnace.

(B) The combustion device for a melting furnace according to the present invention can be used not only as a glass melting furnace illustrated in the foregoing embodiment, but also as a combustion device for a variety of melting furnaces such as a melting furnace for melting a metal other than glass raw material.

(C) In the foregoing embodiment, there was described an example in which three combustion devices for a melting furnace are arranged side by side at the lateral portions of a melting tank along the direction of juxtaposition (the flow direction of glass raw material) of an inlet for charging raw material and an outlet for taking out melted object. Instead, two combustion devices for a melting furnace can be arranged side by side along the direction of juxtaposition (the flow direction of glass raw material) of an inlet for charging raw material and an outlet for taking out melted object. Further alternatively, four or more combustion devices for a melting furnace can be arranged side by side along the direction of juxtaposition (the flow direction of glass raw material) of an inlet for charging raw material and an outlet for taking out melted object.

Incidentally, in the case of the arrangement wherein two combustion devices for a melting furnace are arranged side by side along the direction of juxtaposition (the flow direction of glass raw material) of an inlet for charging raw material and an outlet for taking out melted object, an arrangement should be provided such that the combustion device disposed adjacent the inlet forms an upwardly oriented combustion flame and the combustion device disposed adjacent the outlet forms a combustion flame which extends prominently along the top face of the melting target object.

Further, in the case of the arrangement wherein four or more combustion devices for a melting furnace are arranged side by side along the direction of juxtaposition (the flow direction of glass raw material) of an inlet for charging raw material and an outlet for taking out melted object, like the arrangement of disposing three combustion devices in juxtaposition, an arrangement should be provided such that the combustion device disposed adjacent the inlet forms a combustion flame that extends obliquely upwards, the combustion device disposed adjacent the outlet forms a combustion flame which extends prominently along the top face of the melting target object and the combustion device disposed at an intermediate position between the inlet and the outlet forms a combustion flame that extends upwards, but not so significantly upwards as the combustion flame formed by the combustion device adjacent the inlet and that extends also along the horizontal direction, not so much as the combustion flame formed by the combustion device adjacent the outlet.

(D) In the foregoing embodiment, there was shown the case wherein the fuel injection nozzle includes 2.4 fuel injecting portions vertically juxtaposed. Instead of this, the fuel injection nozzle can include five or more fuel injecting portions.

Further, for each fuel injecting portion, the number of the fuel injection orifices that are to be formed side by side along the horizontal direction can vary in many ways. And, the numbers of the fuel injection orifices to be provided in the respective fuel injecting portions need not to be same, but may vary.

(E) In the foregoing embodiment, there was shown the arrangement wherein of the upper and lower fuel injecting portions provided in the fuel injection nozzle, the plurality of fuel injection orifices provided in the lower side fuel injecting portion are disposed radially side by side. Instead, the plurality of fuel injection orifices may be disposed side by side in parallel with each other.

Industrial Applicability

The present invention is applicable to a combustion device for a melting furnace, wherein a fuel injection nozzle for injecting gas fuel to a combustion space upwardly of an area in a melting tank where a melting target object is present is configured to inject the gas fuel from a lateral portion of the combustion space and a combustion air feeding portion for feeding combustion air along an obliquely downward direction into the combustion space is provided at an upper portion of the fuel injection nozzle, the device being capable of favorably effecting heating of a melting target object with radiant heat of combustion flame and heating of the ceiling portion of the melting furnace with the radiant heat of the combustion flame.

DESCRIPTION OF REFERENCE NUMERALS/MARKS 2 melting tank
4*i* inlet
4*e* outlet
12 fuel injection nozzle
13 fuel injection orifice
14 fuel injection orifice
15 fuel injection orifice
16 fuel injection orifice
A combustion air
B direction along the middle angle
F1 fuel injecting portion
F2 fuel injecting portion
F3 fuel injecting portion
F4 fuel injecting portion
H varying/adjusting means
K combustion air feeding portion
N combustion device for a melting furnace

The invention claimed is:

1. A melting furnace for glass raw material comprising three or more combustion devices, each combustion device comprises;

a fuel injection nozzle for injecting gas fuel to a combustion space above a melting target object as a glass raw material located in a melting tank for melting a glass raw material is configured to inject the gas fuel from a lateral portion of the combustion space; and a combustion air feeding portion for feeding combustion air along an obliquely downward direction into the combustion space is provided above the fuel injection nozzle, wherein the fuel injection nozzle includes a plurality of fuel injecting portions each having a plurality of fuel injection orifices disposed in a row in the horizontal direction as seen from the direction of fuel injection, the plurality of fuel injecting portions disposed one above the other in the vertical direction;

the fuel injection orifices of the plurality of fuel injecting portions are formed so that the fuel injection directions of the fuel injection orifices are arranged radially side by side as seen in a lateral view, with a direction along a middle angle in the angular range between the fuel injection direction of the fuel injection orifice of the uppermost fuel injecting portion and the fuel injection direction of the fuel injection orifice of the lowermost fuel injecting portion being directed obliquely upward;

of the plurality of fuel injecting portions, the fuel injection orifices of the uppermost fuel injecting portion are formed so that the fuel injection directions of the fuel injection orifices are arranged radially side by side on the same plane as seen in the plane view and the fuel injection orifices of the lowermost fuel injecting portion are formed so that the fuel injection directions of the fuel injection orifices are arranged side by side either radially or in parallel with each other on the same plane as seen in the plane view wherein of the plurality of fuel injecting portions, the fuel injection orifices of the upper side fuel injecting portion have a greater diameter than the fuel injection orifices of the lower side fuel injecting portion;

the melting furnace comprises three or more combustion devices disposed side by side at lateral portions of the melting tank along the flowing direction of the melting target object from the inlet for charging the melting target object to the outlet for taking out the melted object in the melting tank;

wherein of the plurality of combustion devices, the gas feeding ratios for the combustion device disposed in the vicinity of the inlet for the plurality of vertical stages of the fuel injecting portions are set such that the ratio for the upper side fuel injecting portion is greater than the ratio for the lower side fuel injecting portion;

of the plurality of combustion devices, the gas feeding ratios for the combustion device disposed at an intermediate position between the inlet and the outlet for the plurality of vertical stages of the fuel injecting portions are set such that the ratio for the upper side fuel injecting portion is equal to the ratio for the lower side fuel injecting portion; and of the plurality of combustion devices, the gas feeding ratios for the combustion device disposed in the vicinity of the outlet for the plurality of vertical stages of the fuel injecting portions are set such that the ratio for the lower side fuel injecting portion is greater than the ratio for the upper side fuel injecting portion.

2. The melting furnace for glass raw material, according to claim 1, there is provided a valve for varying/adjusting the gas feeding ratios for the plurality of vertical stages of the fuel injecting portions.

\* \* \* \* \*

UNITED STATES PATENT AND TRADEMARK OFFICE
CERTIFICATE OF CORRECTION

| | | |
|---|---|---|
| PATENT NO. | : 9,109,836 B2 | Page 1 of 1 |
| APPLICATION NO. | : 13/503259 | |
| DATED | : August 18, 2015 | |
| INVENTOR(S) | : Makoto Hirano et al. | |

It is certified that error appears in the above-identified patent and that said Letters Patent is hereby corrected as shown below:

In the Claims

Column 18, Line 34, Claim 1, delete "a fuel" and insert -- wherein a fuel --

Signed and Sealed this
Twenty-eighth Day of June, 2016

Michelle K. Lee
*Director of the United States Patent and Trademark Office*